United States Patent [19]

Wiener

[11] 4,245,618
[45] Jan. 20, 1981

[54] VAPOR GENERATOR

[75] Inventor: Murray Wiener, Akron, Ohio

[73] Assignee: The Babcock & Wilcox Co., New Orleans, La.

[21] Appl. No.: 949,729

[22] Filed: Oct. 10, 1978

[51] Int. Cl.³ .................................................. F24J 3/02
[52] U.S. Cl. ...................................... 126/438; 60/641
[58] Field of Search .................. 60/641; 126/423, 432, 126/438, 442, 448, 440; 165/1

[56] References Cited

U.S. PATENT DOCUMENTS

| 3,088,494 | 5/1963 | Koch et al. | 165/1 |
| 3,924,604 | 12/1975 | Anderson | 126/438 |
| 3,927,659 | 12/1975 | Blake et al. | 126/438 |
| 4,117,682 | 10/1978 | Smith | 60/641 |
| 4,136,674 | 1/1979 | Korr | 60/641 |

OTHER PUBLICATIONS

"Applied Solar Energy—An Introduction", Aden Meinel and Marjorie Meinel, 1976, Addison-Wesley Publishing Co., pp. 498–500.

Steam, Babcox & Wilcox Co., N.Y., 1963, 37th ed., pp. 9–8,9; 13–1,2,3.

Primary Examiner—Carroll B. Dority, Jr.
Assistant Examiner—Lee E. Barrett
Attorney, Agent, or Firm—R. J. Edwards; R. C. Mai

[57] ABSTRACT

The present invention relates to a solar central receiver or steam generating and superheating unit (20) comprised of a first and a second series of circularly disposed tube panels (21) and (23), respectively. The first series (21) including steam superheating tube panels (12–12') and (14–14') and the second series including steam generating tube panels (16–16'). The steam generating tube panels (16–16') being interposed between at least some of the steam superheating panels (12–12') and (14–14') and the solar heat source.

7 Claims, 10 Drawing Figures

U.S. Patent  Jan. 20, 1981  Sheet 1 of 4  4,245,618
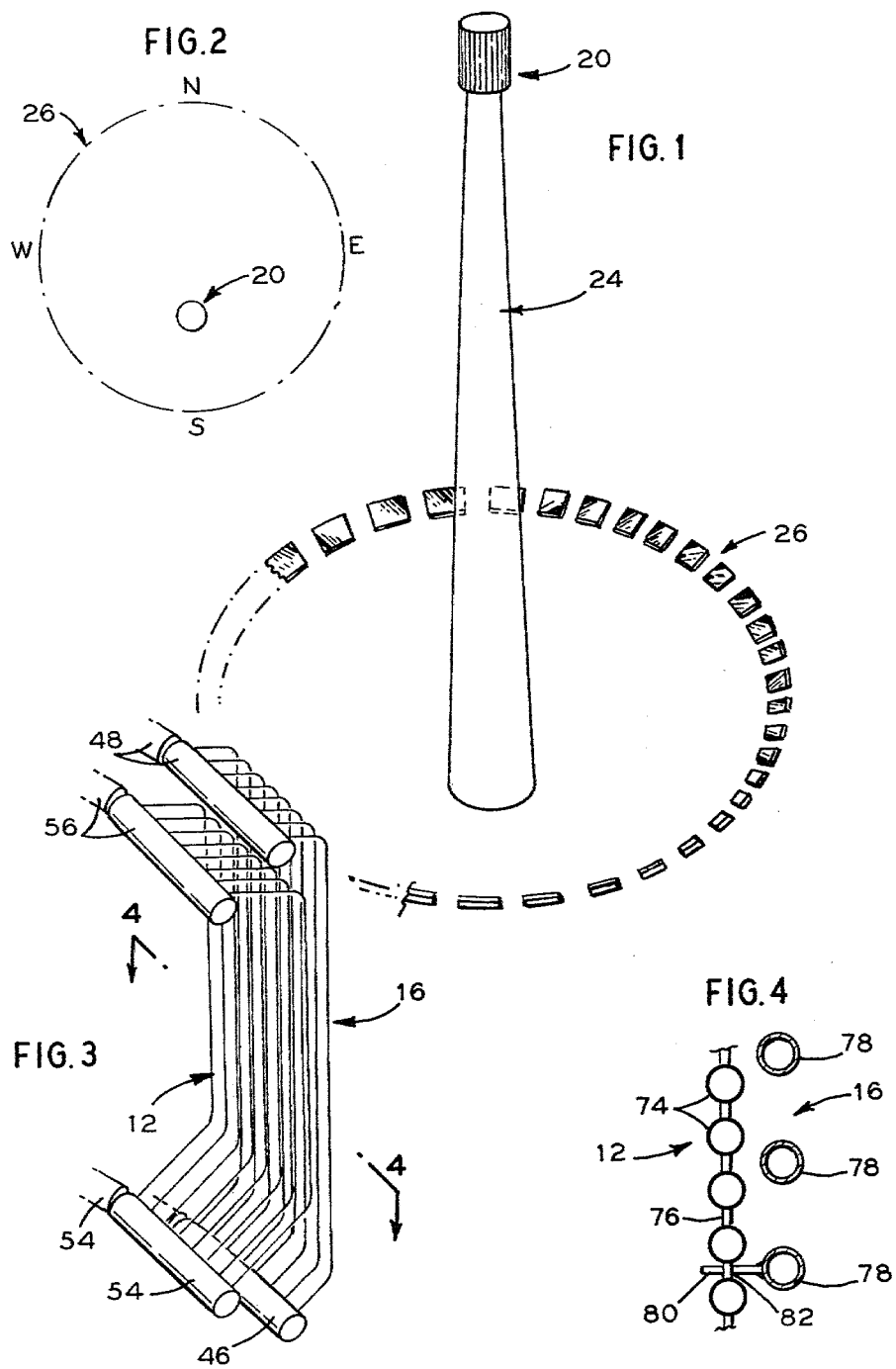

VAPOR GENERATOR

TECHNICAL FIELD

This invention relates, in general, to solar energy; and, in particular, to the generating and superheating of steam by means of solar energy.

BACKGROUND ART

The most common source of energy during modern times has been fossil fuels, such as coal, oil and natural gas. In recent years, the rapid expansion of the world's population coupled with accelerated technological development of large sectors of the world has produced a dramatic increase in the demand for energy. As a result, fossil fuels are being used much faster than they can be obtained and this imbalance can only worsen if we continue to rely solely on these fuels for our energy needs. Thus, there is an urgent need for developing other sources of energy. One alternate energy source currently receiving a great deal of attention is that of solar energy. An overriding problem in the harnessing of solar energy is that the environment of the solar steam generating and superheating unit exposes it to considerable transients of thermal loading due to diurnal cycles and cloud shadowing. Thus, a solar steam generating and superheating unit may find itself exposed to maximum heat flux in a localized area with essentially no heat flux in many of its other heat absorbing areas due to cloud shadowing. This condition gives rise to excessive thermal stresses with eventual failure of the affected heat transfer surfaces. The prior art has sought to alleviate this problem at the expense of high pressure losses, by requiring extremely high fluid flows through the tubes associated with the heat transfer surfaces; or by increasing the size of the solar steam generating and superheating unit. The present invention seeks to eliminate these economically unattractive alternatives of the prior art.

SUMMARY OF THE INVENTION

In accordance with the present invention, there is provided an economically competitive solar central receiver in the form of a steam generating and superheating unit having a wide turndown capability and full reliability and flexibility to adapt to all probable operating conditions to generate as much steam for electric power generation and/or storage as the available sunlight will permit.

One of the objects of the invention is to avoid a departure from nucleate boiling on the internal tube surface during all operating conditions while providing an adequate margin of reserve for transient upsets due to diurnal cycles and cloud shadowing. The departure from nucleate boiling is characterized by a sudden drop in boiling heat transfer coefficient and is followed by transition boiling and film boiling. During transition boiling the tube surface temperature undergoes rapid oscillations, and those of sufficient magnitude may cause fatigue failures. The heat transfer at film boiling is considerably lower than for superheated steam at the same film temperature, thus tube temperatures increase considerably at film boiling. Due to minute variations in operating conditions, the point of departure from nucleate boiling is continuously changing its location along the tube within a certain area, thereby causing frequent local excursions of tube surface temperature from the peak value at film boiling to the low value at nucleate boiling. This has two detrimental effects, firstly, the temperature fluctuations will eventually result in local fatigue of that tube due to cycling and, secondly, adjacent tubes which are weldably joined by webs or membranes can have locally large temperature differences that may cause excessive thermal stresses.

It is also an object of the invention to maintain stable nucleate boiling at much higher steam qualities and at much lower water or steam-water mixture velocities, particularly in zones exposed to high heat fluxes.

It is another object of the invention to arrange the components of the steam generating and superheating unit to assure the greatest heat transfer and to maximize tube cooling in the highest heat flux zones.

It is still another object of the invention to provide the steam generating and superheating unit with two parallel and substantially identical fluid flow paths and with separate means for controlling the temperature of the superheated steam leaving each flow path.

It is a further object of the invention to reduce the heat flux to designated sections of the solar steam generating and superheating unit without increasing its size.

It is still a further object of the invention to provide a substantially uniform heat flux pattern to each of the tube panels of the steam generating and superheating unit.

Accordingly, there is provided in combination with a solar heat source, tubular means for passing a fluid in indirect heat absorbing relation with the solar heat source, the tubular means including steam generating and superheating sections, and the steam generating section being interposed between at least a portion of the steam superheating section and said solar heat source.

BRIEF DESCRIPTION OF THE DRAWINGS

FIG. 1 is a schematic view of a steam generating and superheating unit embodying the invention and disposed on top of a tower surrounded by a heliostat field.

FIG. 2 is a schematic view of the location of the vapor generating and superheating unit with respect to the heliostat field;

FIG. 3 is a perspective schematic view of a primary superheater and a steam generating section tube panel taken from the east group of tube panels;

FIG. 4 is an enlarged detail section taken along line 4—4 of FIG. 3;

BEST MODE FOR CARRYING OUT THE INVENTION

According to FIGS. 1 and 2, there is schematically shown a steam generating and superheating unit 20 which includes a plurality of upright panels mounted in cylindrical fashion on top of a tower 24 and located above a heliostat field 26. In the northern hemisphere, the most efficient use of the heliostat field 26 is obtained by locating the tower 24 southward of the center of the nearly circular field 26 as shown at FIG. 2. This provides a circumferential nonuniform solar heat flux to the tube panels. The highest heat flux is provided to the tube panels located on the north side of the vapor generating and superheating unit 20 while the south panels receive less than 25 percent of maximum heat flux. The solar heat energy absorbed by each tube panel will vary according to the diurnal and seasonal variations of insolation and also depends on cloud shadowing. It will be recognized that the location of tower 24 for a like installation in the southern hemisphere will be northward of the center of the heliostat field with the highest heat flux being provided to the tube panels located on the south side of the vapor generating and superheating unit while the north panels receive less than 25 percent of maximum heat flux.

A particular example of a pilot power plant under consideration by the assignee of the present invention would employ a steam generating and superheating unit as hereinafter disclosed to convert solar energy to superheated steam at 1515 psia. and 960° F. for use in a turbine generator capable of delivering 10 megawatts of electrical power. The multi-paneled steam generating and superheating unit is about 41 feet high and has a diameter of about 23 feet and is mounted on top of a tower which is about 242 feet high. Each of the tube panels in the steam generating and superheating unit is about 3 feet wide and about 41 feet high.

Figure 5:
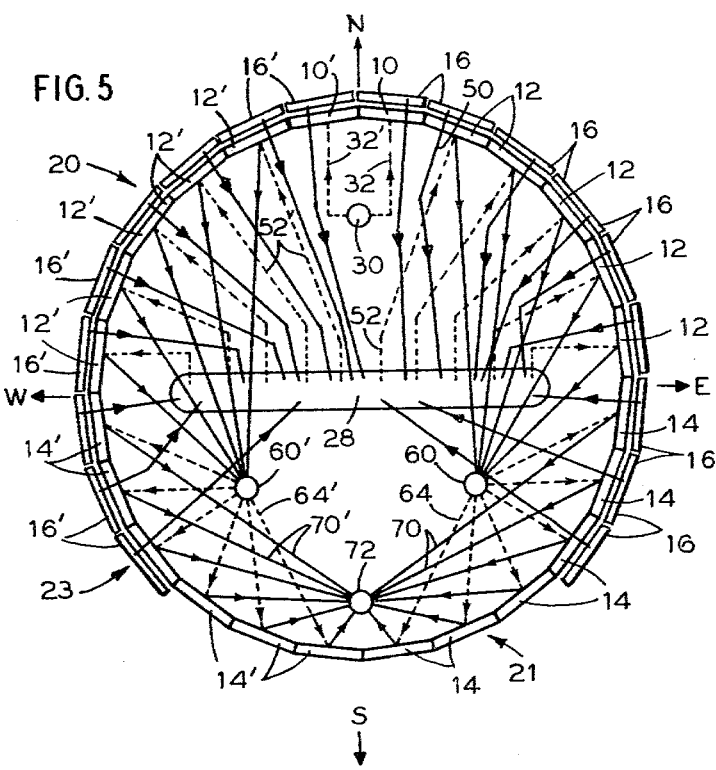
FIG. 5 is a schematic partially sectional plan view of the vapor generating and superheating unit.

The embodiment shown at FIG. 5 is intended as a northern hemisphere installation and depicts the steam generating and superheating unit 20 including a first and second series 21 and 23 of circularly disposed upright tube panels, with the first series 21 numbering twenty-four contiguous tube panels and being partially surrounded by the second series 23 comprised of eighteen contiguous tube panels. Both series of tube panels are divided along the north-south axis of the steam generating and superheating unit 20 into an east and a west group of tube panels, with the latter being identified by primed numbers. The first series 21 includes the economizer or feedwater preheater section comprised of tube panels 10-10'; the primary superheater section comprises of tube panels 12-12'; and the secondary superheater section comprised of tube panels 14-14'. The second series 23 includes the steam generating section comprised of tube panels 16-16' which act as a screen to provide a relatively uniform, low level, heat flux pattern on the shielded tube panels of the first series 21.

The circuitry of the steam generating and superheating unit 20 is described with reference to FIGS. 5 and 7. Aside from the physical location of the economizer, the generating section, and the primary and secondary superheaters, relative to one another, the circuitry is equally applicable to installations in the northern and southern hemispheres. Accordingly, there is shown an upright feedwater supply header 30 flow connected through conduits 32-32' with corresponding inlet headers 34-34' of the economizer tube panels 10-10'. The economizer tube panel outlet headers 36-36' are flow connected through corresponding conduits 38-38' with the water space of a steam water separator 28 extending along the east-west axis of the steam generating and superheating unit 20. The steam-water separator 28 is of the character generally disclosed in U.S. Pat. No. 2,368,211. The water space of steam-water separator 28 is flow connected with the inlet side of a corresponding one of a pair of water circulating pumps 40-40' through conduits 42-42'. The outlet sides of pumps 40-40' are flow connected through conduits 44-44' with corresponding inlet headers 46-46' of the screen tube panels 16-16' which form the steam generating section. The screen tube panel outlet headers 48-48' are flow connected through corresponding conduits 50-50' with the water space of steam-water separator 28. The steam space of the steam-water separator 28 is flow connected through conduits 52-52' with the corresponding inlet headers 54-54' of the primary superheater tube panels 12-12'. The primary superheater tube panel outlet headers 56-56' are flow connected through conduits 58-58' with the inlet side of a corresponding one of a pair of upright headers 60-60'. Water spray attemperators 62-62' of the character generally disclosed in U.S. Pat. No. 2,550,683 are respectively housed within and intermediate the inlet and outlet ends of headers 60-60'. The outlet ends of headers 60-60' are flow connected through conduits 64-64' with corresponding inlet headers 66-66' of the secondary superheater tube panels 14-14'. The secondary tube panel outlet headers 68-68' are flow connected through corresponding conduits 70-70' with an upright superheated steam outlet header 72.

It should be recognized that in accordance with the present invention, the steam generating and superheating unit is divided into two substantially identical parallel fluid flow paths formed by the east and the west group of tube panels 10, 12, 14, 16 and 10', 12', 14', 16', respectively, with secondary steam outlet temperature being separately controlled by the corresponding spray attemperators 62-62' to compensate for differences in heat flux incidence between the east and the west group of tube panels due to diurnal cycles and cloud shadowing.

Figure 7:
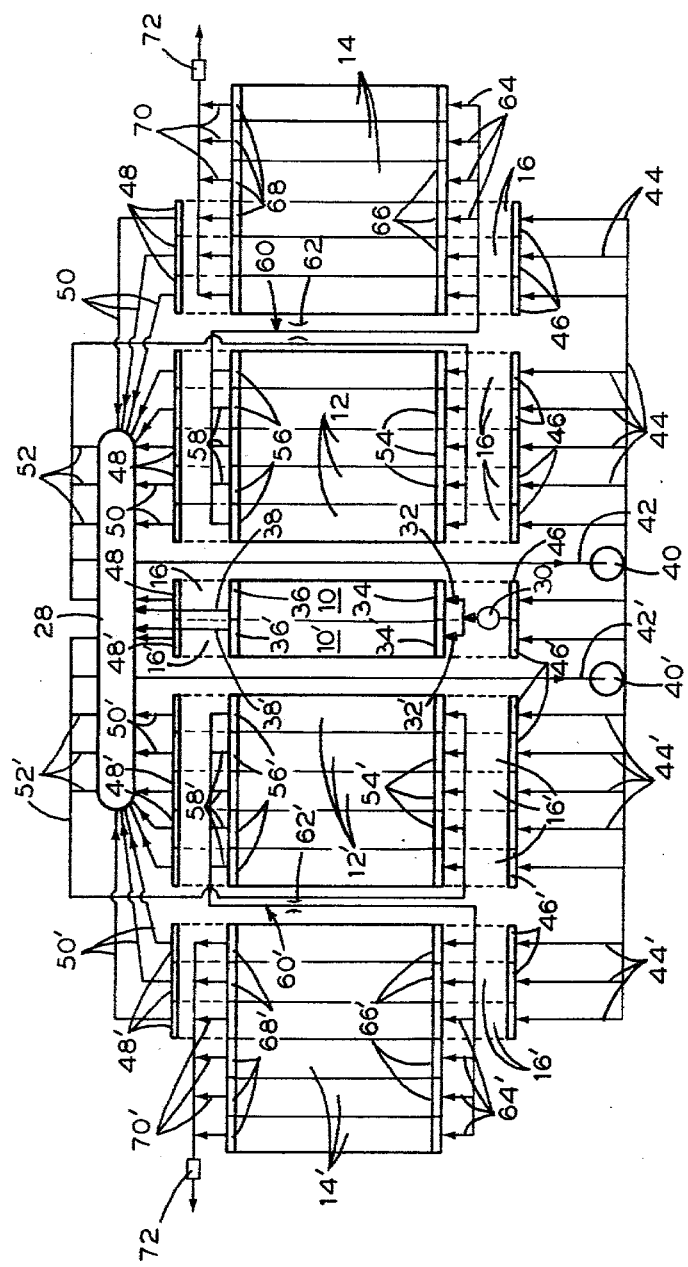
FIG. 7 is a schematic side view of the steam generating and superheating unit laid out in a single plane.

Referring specifically to FIG. 7, it will be seen that the respective inlet headers 34-34', 46-46', 54-54' and 66-66' of the economizer, the generating section, the primary and secondary superheaters are located at the bottom of the tube panels whereas all of the corresponding outlet headers 36-36', 48-48', 56-56' and 68-68' are located at the tntains the higher heat flux on the zone of lower water temperature for the upwardly flowing feedwater. The advantage of this arrangement with respect to the generating section tube panels 16-16' is that it guards against departure from nucleate boiling by maintaining the higher heat flux on the zone of lower steam fraction for the upwardly flowing steam-water mixture. The advantage of this arrangement with respect to the primary and secondary superheater tube panels 12-12' and 14-14', respectively, is that it maintains the higher heat flux on the zone of lower steam temperature for the upwardly flowing superheated steam.

Referring further to FIG. 7, it will be seen that the flow circuitry of the steam generating and superheating unit 20 is of the recirculating type, i.e. the water in the screen or generating section tube panels 16-16' recirculates at flow rates several times higher than the required steam flow, thereby maintaining the steam-water mixture flowing through the screen tube panels 16-16' below the point of departure from nucleate boiling. The relatively low fraction of steam which forms by nucleate boiling is separated from the water as it passes through the steam-water separator 28. The separated steam is routed through conduits 52-52' to the inlet headers 54-54' for flow through the primary superheater tube panels 12-12'. The separated water is mixed with the incoming water from the economizer tube panels 10-10' and routed back by the circulating pumps 40-40' through conduits 42-42' and 44-44' to the inlet headers 46-46' for flow through the screen or generating section tube panels 16-16'.

As heretofore mentioned, it will be seen from FIGS. 5 and 7 that the primary and secondary superheater tube panels 12-12' and 14-14' are divided into an east and a west group of tube panels defining two parallel fluid flow paths. The east and west group of primary and secondary tube panels have the capability for accepting an unbalanced absorption and/or steam flow rate by resorting to their respective spray attemperators 62-62' which inject a regulated quantity of atomized water into the steam to provide the desired secondary superheater outlet steam temperature while compensating for transients of thermal loading due to diurnal cycles and cloud shadowing.

Referring to FIG. 3 there is shown a primary superheater tube panel 12 including inlet and outlet headers 54 and 56, and a screen or steam generating section tube panel 16 including inlet and outlet headers 46 and 48. The tube panel 12 is typical of the tube panels 10-10', 12-12' and 14-14', while the tube panel 16 is typical of the tube panels 16-16'.

Referring to FIGS. 3 and 4, the economizer and the primary and secondary superheater have each of their respective tube panels 10-10', 12-12' and 14-14' formed of laterally spaced tubes 74 rigidly united by metallic webs 76. The metallic webs or membranes 76 are preferably seal-welded to the laterally adjacent tube surfaces to form a light-tight construction thereby preventing solar heat penetration to the support structure of the steam generating and superheating unit 20. However, a seal-welded web construction is highly susceptible to thermal stresses when exposed to high heat fluxes and cyclic operating conditions. Accordingly, the present invention provides a series of screen tube panels 16-16' positioned between the solar heat source and the economizer and primary superheater tube panels 14-14' which are normally exposed to the higher heat fluxes. The screen tube panels 16-16' are constructed of laterally spaced tubes 78. The spacing between the tubes 78 varies in accordance with the predetermined rate of heat flux normally expected for the particular panel location. Thus, the tubes 78 of the screen tube panels 16-16' situated directly in front of the economizer tube panels 10-10' will have the narrowest intertube spacing while the screen tube panels 16-16' situated directly in front of the primary and secondary superheater tube panels 12-12' and 14-14' will have gradually wider intertube spacing as their location is farther removed from the screen tube panels 16-16' situated in front of the economizer. The screen tube panels 16-16' define the steam generating section whose tubes 78 convey subcooled or boiling water which absorbs part of the incident heat. Some of the tubes 78 of each of the screen tube panels 16-16' are weldably fitted with a bar 80 which extends slidably through a slot 82 formed in the web 76 of the oppositely adjacent welded tube panel 10-10', 12-12' or 14-14' thereby providing an attachment which maintains the appropriate intertube spacing and inhibits vibration while compensating for differential thermal growth between the screen and welded tube panels.

It has been determined that one row of screen tubes can reduce the heat flux by 30 to 70 percent depending on tube size and intertube spacing, per known relation established by H. C. Hottel "Radiant Heat Transmission", Mechanical Engineering, Volume 52. With the proper variable spacing of screen tubes it is possible to obtain a relatively uniform, low level, heat flux pattern around the circumference of the steam generating and superheating unit 20.

Figure 8:
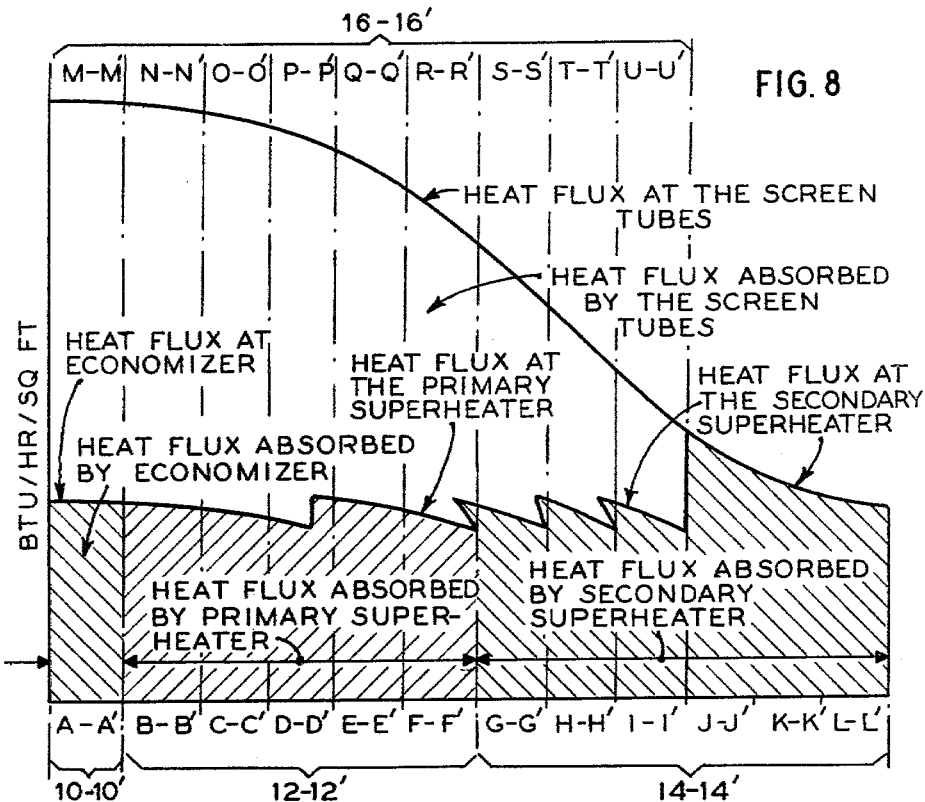
FIG. 8 is a graph showing the heat flux absorbed by the economizer, the generating section and the primary and secondary superheater tube panels.
Figure 9:
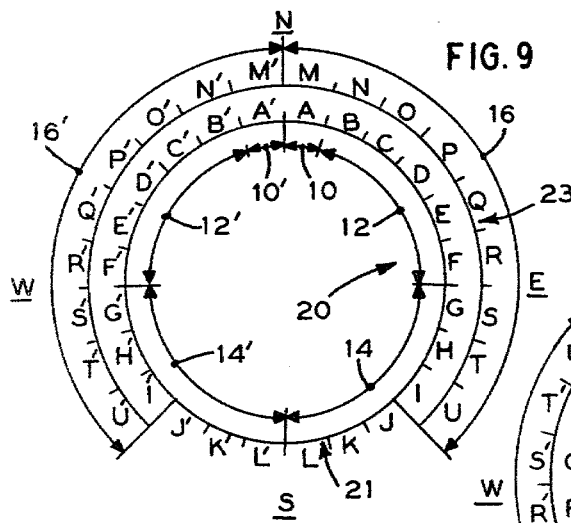
FIG. 9 is a schematic view of the location of the economizer, the generating section and the primary and secondary superheater tube panels in a steam generating and superheating unit situated in the northern hemisphere.
Figure 10:
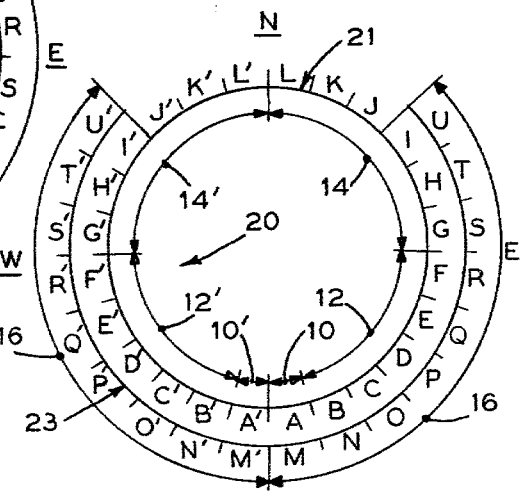
FIG. 10 is a schematic view of the location of the economizer, the generating section and the primary and secondary superheater tube panels in a steam generating and superheating unit situated in the southern hemisphere.

Referring to the graph shown at FIG. 8, it can be seen that the individual tube panels A-A' representing all of the economizer tube panels 10-10', the individual tube panels B-B', C-C', D-D', E-E' and F-F' representing all of the primary superheater tube panels 12-12', and the individual tube panels G-G', H-H' and I-I' representing some of the secondary superheater tube panels 14-14' absorb a relatively uniform, low level quantity of heat flux by virtue of the heat flux absorbed by the individual tube panels M-M', N-N', O-O', P-P', Q-Q', R-R', S-S', T-T' and U-U' representing all of the screen or generating tube panels 16-16' and positioned intermediate the solar heat source and the tube panels A-A' through I-I'. It will be recognized that the secondary superheater tube panels J-J', K-K' and L-L' do not have screen tube panels situated in front of them and will, therefore, experience a generally greater absorption of heat flux even though they are located in a zone of somewhat lower heat flux incidence. FIGS. 9 and 10 are keyed to the graph of FIG. 8 and are schematic plan views of the location of individual tube panels A-A' through U-U' for installations of the steam generating and superheating unit 20 in the northern and southern hemispheres, respectively. As shown in FIGS. 9 and 10, the first or inner tube panel series 21 includes the economizer tube panel 10-10' comprising the individual tube panel A-A', the primary superheater tube panels 12-12' comprising the individual tube panels B-B' through F-F', and the secondary superheater tube panels 14-14' comprising the individual tube panels G-G' through L-L'. The second or outer tube panel series 23 includes the screen or steam generating section tube panels 16-16' comprising the individual tube panels M-M' through L-L'. It will be recognized that in a northern hemisphere installation of a steam generating and superheating unit 20, as shown at FIG. 9, the individual tube panels A-A' and M-M' are the northernmost panels of the first and second tube panel series 21 and 23, respectively, whereas in a southern hemisphere installation of the steam generating and superheating unit 20, as shown at FIG. 10, the individual tube panels A-A' and M-M' are the southernmost panels of the first and second tube panel series 21 and 23, respectively.

Figure 6:
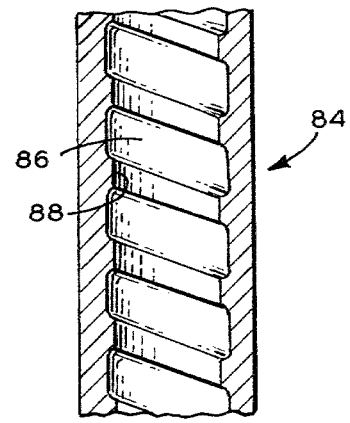
FIG. 6 is a longitudinal section of an internally ribbed tube.

In accordance with the invention, the economizer and the screen or steam generating section tube panels 10-10' and 16-16' are situated in the highest heat zones and are equipped with ribbed tubes 84 as shown at FIG. 6. The ribbed tubes 84 are of a character generally disclosed in U.S. Pat. No. 3,088,494. Each tube 84 is formed throughout its length with at least one continuous helical groove 86 to provide fluid turbulence promoting helical lands or ribs 88 intermediate the convolutions of the groove 86. This arrangement prevents departure from nucleate boiling in tubes exposed even to very high heat fluxes.

In the operation of the steam generating and superheating unit 20, the feedwater is introduced through the upright header 30 and through the economizer inlet headers 32-32' and is preheated as it passes through the economizer tube panels 10-10'. The preheated feedwater is discharged through the economizer outlet headers 36-36' and conveyed by the conduits 38-38' to the water space of the steam-water separator 28 to be mixed with the saturated water separated from the steam-water mixture flowing from the conduits 50-50'. A pair of downcomer pipes or conduits 42-42' convey the water to the pumps 40-40' for circulation through conduits 44-44' to the vapor generating section inlet headers 46-46', the water becomes partially vaporized as it flows through the screen tube panels 16-16'. The steam-water mixture is discharged through the screen tube outlet haders 48-48' and is conveyed by the conduits 50-50' to the steam-water space of the steam-water separator 28. The separated water is routed to the water space of the steam-water separator 28 and is mixed with the incoming preheated feedwater. The separated steam is routed through conduits 52-52' to the primary superheater inlet headers 54-54' and is superheated as it passes through the primary superheater tube panels 12-12'. The superheated steam is discharged through the primary superheater outlet headers 56-56' and is conveyed by conduits 58-58' to the inlet ends of a pair of upright headers 60-60'. The superheated steam passes through a pair of attemperators 62-62' where it mixes with a regulated quantity of atomized water injected whenever temperature reduction is required. The superheated steam leaving the outlet ends of headers 60-60' is conveyed through conduits 64-64' to the secondary superheater inlet headers 66-66' and is further superheated as it passes through the secondary superheater tube panels 14-14'. The superheated steam is discharged through the secondary superheater outlet headers 68-68' and is conveyed by conduits 70-70' to an upright secondary superheated steam outlet header 72 for delivery to a steam generator turbine, not shown, or a steam storage facility, not shown.

While in accordance with the provisions of the statutes, there is illustrated and described herein a specific embodiment of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. In combination with a solar heat source, tubular means, mounted on a tower, the tower being located eccentrically in a heliostat field, for passing a fluid in indirect heat absorbing relation with the heat source, the tubular means including first heat exchanger means, second heat exchanger means disposed downstream fluid flow-wise of the first heat exchanger means, third heat exchanger means disposed downstream fluid flow-wise of the second heat exchanger means, wherein the second heat exchanger means is interposed between at least a portion of the first and third heat exchanger means and said heat source, wherein the tubular means of said first, second and third heat exchanger means are respectively grouped into upright panels with fluid inlet means disposed at the bottom of the tubular panels, the panels of the first and third heat exchanger means being disposed in side-by-side side relation to form a nearly cylindrical tubular wall, the panels of the second heat exchanger means being disposed in a side-by-side relation and in spaced surrounding relation with at least a portion of the tubular wall and having the tubular means in the panels of the first and third heat exchanger means laterally spaced and rigidly united by metallic webs to produce a structure impermeable to light from the heliostat field, the second heat exchanger means having tubes with varying lateral spacing to provide a relatively uniform, low level, heat flux pattern to the first and third heat exchanger means and including associated means for pump assisted natural circulation.

2. The combination according to claim 1 wherein the first, second and third heat exchanger means are segmented to define a pair of fluid flow paths, and including means for controlling the temperature of the vapor leaving each of said fluid flow paths.

3. The combination according to claim 1 wherein said first heat exchanger means comprises fluid heating tubes.

4. The combination according to claim 1 wherein said second heat exchanger means comprises vapor generating tubes.

5. The combination according to claim 1 wherein said third heat exchanger means comprises vapor superheating tubes.

6. The combination according to claim 1 including vapor-liquid separating means, the liquid portion in said vapor-liquid separating means discharging to circulating pump means flow connected to the second heat exchanger means and the vapor portion in said vapor-liquid separating means flow connected to the third heat exchanger means.

7. The combination according to claim 1 wherein the lateral spacing of the second heat exchanger tubular means exposed to high heat flux is narrower than the lateral spacing of the second heat exchanger tubular means exposed to low heat flux.

* * * * *

UNITED STATES PATENT AND TRADEMARK OFFICE
CERTIFICATE OF CORRECTION

PATENT NO. : 4,245,618

DATED : January 20, 1981

INVENTOR(S) : Murray Wiener

It is certified that error appears in the above-identified patent and that said Letters Patent are hereby corrected as shown below:

In Column 4, line 51, delete "tntains" and insert--top of the tube panels. This arrangement permits the application of peak heat fluxes along the bottom of the vertical or upright oriented economizer, generating section, and primary and secondary superheater tube panels 10-10', 16-16', 12-12' and 14-14', respectively. The advantage of this arrangement with respect to the economizer is that it maintains--

In Claim 1, Column 8, line 15 delete "side" after--side-by-side--

Signed and Sealed this

Sixteenth Day of February 1982

[SEAL]

Attest:

GERALD J. MOSSINGHOFF

Attesting Officer     Commissioner of Patents and Trademarks